Figure 1:
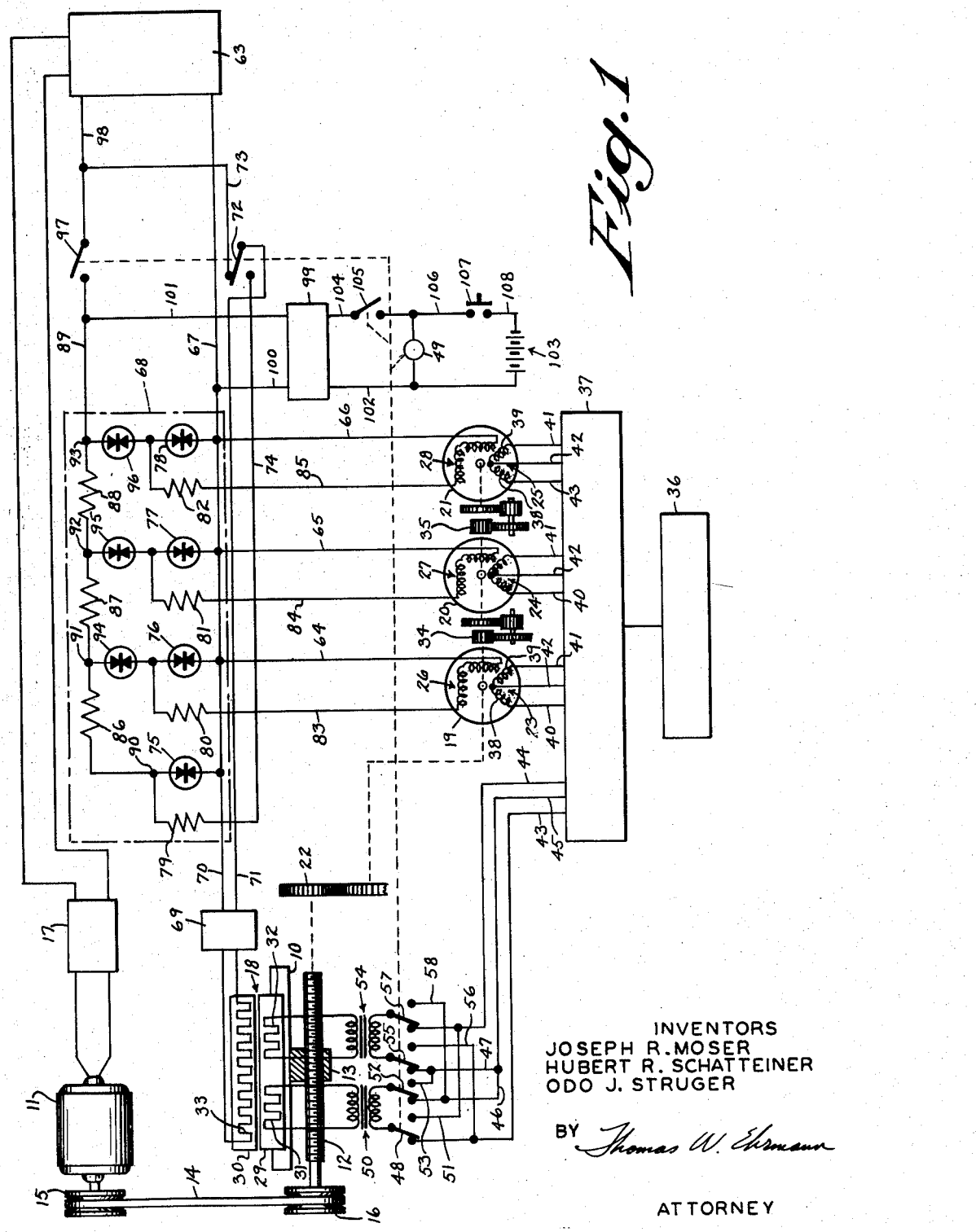

March 31, 1964  J. R. MOSER ETAL  3,127,546
SINGLE SIDE APPROACH SERVO SYSTEM
Filed June 28, 1962  2 Sheets-Sheet 1

INVENTORS
JOSEPH R. MOSER
HUBERT R. SCHATTEINER
ODO J. STRUGER

BY Thomas W. Ehrmann

ATTORNEY

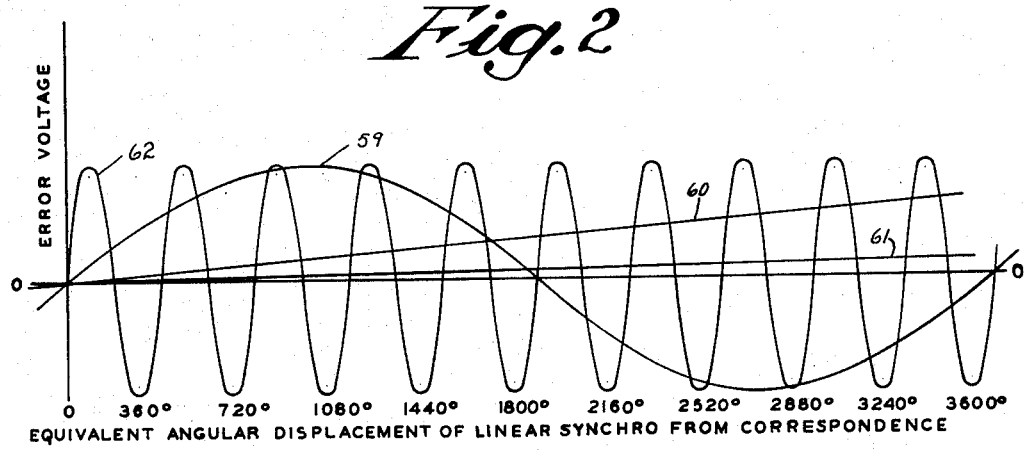
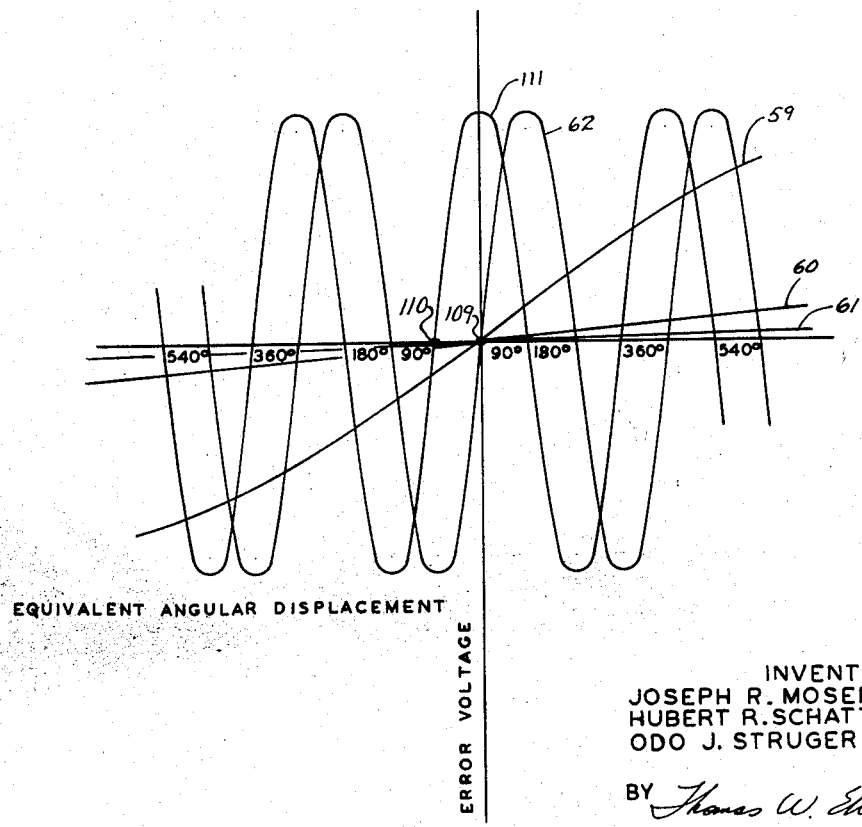

United States Patent Office 3,127,546
Patented Mar. 31, 1964

3,127,546
SINGLE SIDE APPROACH SERVO SYSTEM
Joseph R. Moser, Brookfield, and Odo J. Struger and Hubert R. Schatteiner, Milwaukee, Wis., assignors to Allen-Bradley Company, Milwaukee, Wis., a corporation of Wisconsin
Filed June 28, 1962, Ser. No. 205,895
4 Claims. (Cl. 318—28)

This invention relates to servomechanisms, and more specifically to a single side approach system for an object position control system, and which single side approach system first momentarily positions the object at a position which is offset always to the same one side of a final desired position to which the object is then moved.

Feedback control systems adapted to accurately position an object upon command rely upon error detectors which give a signal indication of the difference between the actual position of the object at any time and a preselected desired position for the object. The signal produced by the error detector is employed to control a drive for the object, and which drive normally includes a servo-motor. The error detector commonly includes alternating current type linear or rotary induction devices. The linear or rotary induction devices, commonly termed synchros, are quite similar in operation and vary primarily in their construction. The rotary form of synchro includes primary and secondary windings wound about rotor and stator members. One form of a feedback control system employs a plurality of such rotary synchros which are mechanically coupled to the object to be positioned and are in turn mechanically coupled to one another by suitable gearing so that the angular displacement of the rotor member with respect to the stator member of each synchro is in a fixed relation to the linear movement of the table. Information concerning a desired position for the object is introduced to a command unit which produces signals indicative of such desired position and such signals are converted into analog voltages impressed upon the windings of one of the stator or rotor members of each of the rotary synchros. Thereafter, angular displacement of the rotor members, which is controlled by the position of the object, gives rise to error voltages which are employed to control the degree and direction of movement of the drive. When the error voltage is zero the object has been brought to its preselected desired position.

A plurality of rotary synchros each having its respective zone of control are used successively as the object travels toward the desired position to obtain greater accuracy and precision in positioning. Means are provided to transfer the control of the drive from relatively coarse control rotary synchros to finer controlled rotary synchros as the positional disagreement decreases. A common problem in such an arrangement of rotary synchros is the error in positioning which is introduced by the mechanical backlash inherent in the gearing connecting the synchros to the object to be positioned.

Another form of feedback control system employs a linear synchro as the finest control together with a plurality of rotary synchros for coarser control of the object. The advantage attendant with the use of linear synchros is that the stator or rotor member, termed slider and scale in the art of linear synchros, may be connected directly to the object without requiring gearing or coupling thereby eliminating the element of backlash from the final control of the system. However, other problems are inherent in such systems which affect the accuracy in positioning. For example, the error signal employed to control the drive decreases to zero at the desired position. If it now is desired to move the object a very slight distance away from the previous position, the signal emitted from the error detectors indicating a positional disagreement corresponding to such slight distance will of necessity be quite small. Furthermore, it is difficult for the drive to accelerate and decelerate within the short distance of movement desired. Thus, there are limitations on the minimum movement of the object which a feedback control system has heretofore been capable of accurately controlling.

In addition, the drive for the object builds up considerable momentum while moving the object to the desired position, especially when such movement has included a substantial distance. Because of such momentum, it is difficult at best to sufficiently slow down the drive as the object nears the desired position with the result that the drive may cause the object to travel beyond the desired position.

It has been found that the problem of mechanical backlash, the difficulty in positioning over small increments of distance, and the problem of drive momentum have been found to be alleviated by utilizing single side approach. That is, the control system halts the object momentarily at a point which is offset from the final position and then the control system moves the object always from the same direction to the desired position.

It is a principal object of this invention to provide a single side approach system for a feedback control system and which causes final positioning of the object to be accomplished from one direction only.

It is also an object of this invention to provide a single side approach system for an object positioning control system and which causes the object to be halted momentarily at an offset position always to the same side of a desired final position before movement of the object to the final position whereby inaccuracies due to mechanical backlash and momentum of the drive for the object are minimized and whereby the minimum amount of object movement which may be controlled is greatly decreased.

It is a further object of this invention to provide a single side approach system which accomplishes the above objects by utilizing the same control for positioning automatically both to the offset position and to the final position and which requires only one set of input information for positioning to both positions.

The system of this invention includes as the finest control synchro either a rotary synchro having primary windings spaced 90° apart or a linear synchro in which the slider has two windings which are in 90° space phase. In either event, one of the two windings may be considered a sine winding and the other a cosine winding. Input signals indicative of a final position for the object are fed to such windings and the input signals are in terms of the sine and cosine of the angular relationship between the rotor and stator member, or the equivalent angular relationship between the slider and scale, which will yield the final position of the object. The system of this invention initially positions the object at an offset position by feeding the input signal which is in terms of the cosine with reversed polarity to the sine winding and by feeding the input signal in terms of the sine to the cosine winding thereby signaling a desired position offset from the final position. Then, the input signals in terms of the sine and cosine are fed to the sine and cosine winding respectively to signal the final position. The offset position is, therefore, displaced in an amount equivalent to 90° of angular displacement of the rotor and stator members. This distance is constant and approach to the final position occurs from only one side.

The foregoing and other objects of this invention will appear in the description to follow. In the description, reference is made to the accompanying drawings which form a part hereof and in which there is shown by way of illustration a specific form in which this invention may be practiced. The form will be described in detail to enable those skilled in the art to practice this invention, but it is to be understood that other embodiments of the invention may be used and that changes in the embodiment described may be made by those skilled in the art without departing from the true scope of the present invention. Consequently, the detailed description is not to be taken in a limiting sense and the scope of the present invention is best defined by the appended claims.

In the drawings:

FIG. 1 is a schematic diagram of a feedback control system embodying the invention, FIG. 2 is a chart of the loci of the peaks of the voltage output of the synchros, employed in the system of FIG. 1, with respect to position plotted, positive when in phase with the source or supply voltage and negative when 180° out of phase with source or supply voltage, and FIG. 3 is an enlarged portion of the chart of FIG. 2 illustrating the effect of the single side approach system of this invention.

The single side approach system of this invention is adapted for use in a feedback control system, as for example in a machine tool control system illustrated in FIG. 1. While the system of this invention will be described as being employed with the machine tool control, it is to be understood that the use of the single side approach system of this invention is not limited to use in a machine tool control but rather has application to servomechanisms generally.

In FIG. 1, the control system is adapted to accurately and precisely position a work table 10 of a machine tool. Movement of the table 10 is accomplished by a drive which includes a D.C. shunt type motor 11 mechanically connected to a lead screw 12 which operates in a nut 13 securely affixed to the table 10. The lead screw 12 is rotatably supported by the base of the machine tool (not shown) so that it is stationary relatively to the table 10 and will effect movement of the table as it is rotated by the motor 11. The mechanical connection between the motor 11 and the lead screw 12 may take the form of a belt 14 which is driven by a pulley 15 affixed to the output shaft of the motor 11 and which drives a pulley 16 secured to an extending portion of the lead screw 12. A motor control circuit, of conventional design and illustrated schematically in FIG. 1 is a motor control unit 17, controls the direction and speed of drive of the motor 11 in accordance with signals produced by the control system, as will hereinafter be described.

A position error detector for the control system includes a linear synchro designated generally as 18 and a plurality of rotary induction devices or rotary synchros, which may be in the form of three resolvers 19, 20 and 21, and which are mechanically coupled to the lead screw 12 by suitable gearing 22. A resolver is a form of rotary synchro having dual element primary and secondary windings and in which the dual elements are spaced 90° apart. Thus, each resolver 19, 20 and 21 has a two element primary or input winding 23, 24 and 25 respectively, with the elements being spaced 90° apart and each resolver also has a two element secondary or output winding 26, 27 and 28, respectively, also with the elements spaced 90° apart. Either primary or secondary winding of each resolver may be mounted on a stator member and the other on a rotor member. It will be assumed hereafter that the secondary windings 26, 27 and 28 are mounted on the rotor members of the resolvers 19, 20 and 21, respectively.

As is known in the art, a linear synchro has an essential similarity to that of a rotary synchro. The stator of a linear synchro is known as the slider and the rotor as the scale. Either slider or scale may comprise the moving element, the other being stationary. In FIG. 1, the slider 29 is shown affixed to the machine tool table 10 with the scale 30 affixed to a stationary portion of the base of the machine tool (not shown). Thus, the scale 30 is stationary relative to the slider 29 in the control system illustrated. The slider 29 has two windings 31 and 32 which are similar to the two elements of the primary windings of the resolvers 19, 20 and 21 in that they are in 90° space phase. The scale 30 has one winding 33 which may be repeated throughout its length as desired and which corresponds to the secondary windings 26, 27 and 28 of each of the resolvers 19, 20 and 21, respectively, although the scale 30 does not have a pair of windings in 90° space phase. For reasons which will later appear, the winding 31 may be considered a sine winding and the winding 32 may be considered a cosine winding.

The rotor member of the resolver 19 is mechanically connected to the lead screw 12 through the gearing 22 so that the angular displacement of such rotor member relative to its stator member is in a fixed relation to the linear travel of the table 10. Let it be assumed for basis of further discussion that the ratio of the gearing 22 is such that the rotor member of the resolver 19 makes one complete revolution for each one inch of travel of the table 10. In addition, successive adjacent resolvers are mechanically connected by gearing generally of identical ratio; as for example, 10:1. Thus, the rotor member of the resolver 20 is connected to the rotor member of the resolver 19 by gearing 34 whereby the rotor member of the resolver 20 will make one complete revolution for each ten revolutions of the rotor member of the resolver 19 or one complete revolution for each ten inches of travel of the table 10. Similar gearing 35 connects the rotor member of the resolver 21 to the rotor member of the resolver 20. Thus, the rotor member of the resolver 21 makes one complete revolution for each one hundred inches of travel of the table 10, and for each revolution of the rotor member of the resolver 21 the rotor members of the resolvers 20 and 19 will make ten and one hundred revolutions respectively. The resolvers 19, 20 and 21 may, therefore, be characterized as high speed, medium speed and low speed resolvers respectively.

In the linear synchro 18, linear distances are equivalent to the angular rotation of the rotor member of a rotary synchro. Thus, a complete revolution of the rotor member of a rotary synchro has its equivalent in a preselected linear movement of the slider 29 relative to the scale 30. In the system being described this cycle comprises 0.1 inch of linear movement and, therefore, this cycle of relative linear movement of the slider 29 and the scale 30 is repeated one thousand times for each revolution of the rotor member of the resolver 21, if the problem of backlash in the gearing is not considered.

Information concerning the desired preselected position for the table 10 must be fed to the control system and this may be accomplished in any one of a number of conventional manners such as by use of rotary switches, push button keyboards, or punched tape readers. Since the form of input data unit employed forms no part of this invention, the input information is illustrated schematically in FIG. 1 as being related from a command unit 36. The input information is then translated into voltage signals which can be imposed across each element of the primary windings 23, 24 and 25 of the resolvers and across the windings 31 and 32 of the slider 29 of the linear synchro 18. Voltages imposed across the primary windings and the slider windings may be produced by input signal means in the form of a digital to analog converter 37, also of conventional design and known operation. The digital to analog converter 37 includes a series of transformers which may be tapped at various points at the direction of the command unit 36 to produce output voltages for representing shaft position of the rotors of the resolvers and corresponding linear position of the slider 29 relative to the scale 30 which will yield the desired position of the table 10. For example, the two 90° spaced elements 38 and 39 which comprise the primary winding 23 of the resolver 19 are connected to the digital to analog converter 37 by a conductor 40 connected to one end of the first element 38, a conductor 41 connected to one end of the second element 39 and a common conductor 42 connecting the second ends of both the elements 38 and 39 to the digital to analog converter 37. The converter 37 then imposes voltages across the pairs of conductors 40, 42 and 41, 42 in terms of the sine and cosine of the angular shaft position of the rotor member relative to the stator member of the resolver 19. That is, the voltage imposed across the conductors 40 and 42 and thereby imposed across the first element 38 is in terms of the sine of the angle which the rotor member makes with the stator member when the table 10 is at its final desired position, and the voltage imposed across the conductors 41 and 42 and thereby imposed across the second element 39 of the secondary winding 23 will be in terms of the cosine of such angular position. Normally, then, when the resulting voltage induced in the secondary winding 26 of the resolver 19 is zero the angular position of the rotor member relative to the stator member will be that which results from the table 10 being in the final desired position.

Voltages in terms of the sine and cosine of the angular position equivalent to the linear position of the slider 29 relative to the scale 30 which will yield the final desired position of the table 10 are also imposed across the windings 31 and 32 of the slider 29. Three conductors, 43, 44 and 45, corresponding to the conductors 40, 41 and 42, lead from the digital to analog converter 37. Voltages in terms of the sine of the equivalent angular position are imposed across the pair of conductors 43 and 45 and voltages in terms of the cosine are imposed across the pair of conductors 44 and 45, the conductor 45 being a common connection. Branch conductors 46 and 47 are connected to the common conductor 45 which leads from the converter 37. A first double throw relay switch 48 of a relay 49 has a relay drop-out position in which it connects the input conductor 43 to one end of the primary winding of a step-down transformer 50 and an actuated position in which it connects the one end of the primary winding to a conductor 51 which in turn is connected to the conductor 44. A second double throw relay switch 52 has a relay drop-out position connecting the other end of the primary winding of the transformer 50 to the conductor 46 connected in turn to the common input conductor 45, and an actuated position in which it connects such other end of the primary winding to a conductor 53 which is connected to the other conductor 47 which leads from the common input conductor 45. With the relay switches 48 and 52 in the drop-out position shown in FIG. 1, a voltage in terms of the sine of the equivalent angular position is impressed across the sine winding 31 of the slider 29 since the sine winding 31 is connected to the secondary winding of the step-down transformer 50. The secondary winding of a second step-down transformer 54 is connected to the winding 32 of the slider 29. One end of the primary winding of the second transformer 54 is connected through a third relay switch 55 to the conductor 47 when the third relay switch 55 is in its relay drop-out position, and is connected to a conductor 56 connected in turn to the conductor 43 when the third relay switch 55 is in its actuated position. The second end of the primary winding of the second transformer 54 is connected through a fourth relay switch 57 to the conductor 44 when the fourth relay switch 57 is in its relay drop-out position, and such second end is connected to a conductor 58 when the relay switch 57 is in its actuated position. The conductor 58 is connected to the conductor 46. Therefore, a voltage in terms of the cosine of the relative angular position is imposed upon the cosine winding 32 of the slider 29 when the relay switches 52 and 53 are in their drop-out position shown in FIG. 1. The function of the first through fourth relay switches and the significance of their respective actuated positions will be considered hereafter. Suffice it to say at this time that during the initial operation of the control system, the relay 49 is energized and thus the relay switches 48, 52, 55 and 57 are in their actuated positions.

A plurality of conventional command resolvers which are identical to the resolvers 19, 20 and 21 may be employed as the input signal means in place of the digital to analog converter 37. When such command resolvers are employed, the command unit 36, in effect, positions the rotor windings of the command resolvers relative to the stator windings so that voltages are imposed in the primary windings 23, 24 and 25 and in the windings 31 and 32 of the slider 29 which induces an error voltage in the secondary windings 26, 27 and 28, and in the winding 33 of the scale 30. Again, when the voltage induced in the secondary windings and in the winding 33 of the scale 30 is zero the resolvers and linear synchro 18 are said to be in correspondence and the preselected position of the table 10 has been reached.

The alternating error voltage induced in each of the secondary windings 26, 27 and 28 varies with the position of the rotor member relative to the stator member and similarly the alternating error voltage induced in the winding 33 of the scale 30 varies with the position of the scale 30 relative to the slider 29. The values of the maximum voltages that may be induced will attain a peak value and decrease to zero value twice in each revolution of the rotor member. Furthermore, the value of the maximum voltage that may be induced in the winding 33 of the scale 30 will attain a peak value and decrease to zero periodically and as indicated the complete cycle occurs for each 0.1 inch of linear travel of the table 10. For one-half revolution, the error voltage induced in the rotor members will have an in-phase relation with the supply voltage impressed across the associated primary windings 23, 24 and 25 and for the other half revolution the error voltage will be in phase reversal with respect to the supply voltage. The same is true for the half-cycles of the error voltage output of the winding 33. The values of maximum induced error voltages present an envelope that varies sinusoidally with rotational position. When the error voltage is in phase with the supply voltage a plot of such in-phase error voltages is represented by a positive half-cycle of a sinusoidal curve of FIG. 2 and when the error voltage is in phase reversal with the supply voltage a plot of such error voltages is represented by a negative half-cycle of a sinusoidal curve of FIG. 2.

In FIG. 2 the abscissa represents the equivalent angular displacement in degrees of the slider 29 relative to the scale 30 and the ordinate represents the error voltage induced in the secondary windings 26, 27 and 28 and in the winding 33 of the scale 30. A sinusoidal curve 59 for the secondary winding 25 of the high speed resolver 19 completes one cycle for each 3600° of equivalent angular displacement of the linear synchro 18. Since the rotor member of the medium speed resolver 20 makes one complete revolution for each ten revolutions of the rotor member of the high speed resolver 19 due to the gear ratio chosen for the gearing 34, a sinusoidal curve 60 for the medium speed resolver 20 completes one cycle for each ten cycles of the curve 59. Similarly, each cycle of a sinusoidal curve 61 for the low speed resolver 21 encompasses ten cycles of the curve 60. Complete cycles of the curves 60 and 61 are not shown because of the abscissa scale employed. Since the linear synchro 18 is chosen to complete a cycle for each 0.1 inch linear travel of the table 10 and the high speed resolver 19 is geared to the lead screw 12 to complete one revolution for each one inch of linear movement of the table 10, a sinusoidal curve 62 for the winding 33 of the scale 30 completes ten cycles for each one cycle of the sine curve 59 for the high speed resolver 19.

From FIG. 2 it can be seen that if the positional disagreement is substantial, the error voltage output of the linear synchro 18 cannot be employed to control the drive of the motor 11 since the envelope of the error voltage output of the scale winding 33 would follow the curve 62 to the closest zero value which may be a multiple of 0.1 inch away from the desired position of the table 10 and would result in a false position. This false position would be reached by the action of a phase discriminator 63 which when supplied with an error voltage which falls in the negative half cycle of the curve 62 will cause the motor 11 to drive in one direction and which when supplied with an error voltage which falls in the positive half-cycle of the curve 62 will cause the motor 11 to drive in an opposite direction. Therefore, the resolvers 19, 20 and 21 and the linear synchro 18 each has its individual zone of control which is about equal to one-half cycle of its respective sinusoidal curve. Control of the motor 11 must be transferred from one resolver to the adjacent higher speed resolver and ultimately to the linear synchro within the zone of control of the respective higher speed error detector device.

A voltage switching circuit is employed to perform the function of transferring control of the motor 11 from one to another of the resolvers and linear synchro 18 within their respective zones of control. The voltage switching circuit may take the form of a static switch circuit which is fully disclosed and described in the co-pending application of Lynn H. Matthias and Odo J. Struger for "Static Switch for Multi-Speed Error Detector Control System", Serial No. 165,636, filed January 11, 1962, and assigned to the assignee of this invention.

One lead 64, 65 and 66 of each of the secondary windings 26, 27, and 28, respectively, of the resolvers are connected together by one output lead 67 of the static switch circuit designated generally as 68. The scale winding 33 has two output leads which are fed to a linear synchro amplifier 69 of known construction and operation, and one lead 70 from the linear synchro amplifier 69 is connected to the output lead 67 of the static switch circuit 68. A second lead 71 from the linear synchro amplifier 69 is connected to the pole of a fifth single pole double throw relay switch 72 of the relay 49 which in its relay dropout position connects the lead 71 to a conductor 73 and when actuated connects the lead 71 to a conductor 74. The leads 70, 64, 65 and 66 which are connected by the output lead 67 of the static switch circuit 68 are each in turn connected to one side of voltage limiting non-linear conductors preferably in the form of double anode or symmetrical zener diodes 75, 76, 77 and 78 respectively. Zener diodes are a form of non-linear conductor which exhibit not only a voltage drop in their forward direction but also exhibit the characteristic of breakdown in their reverse direction when the voltage exceeds a certain level, the value of which is termed the breakdown voltage. A double anode or symmetrical zener diode may be considered to be two single anode zener diodes so connected that there is a symmetrical breakdown in both directions, the breakdown in both directions being necessary when an A.C. source is used for the control system.

A protecting resistor 79 is connected to the conductor 74 and connects to the other side of the double anode zener diode 75. Protecting resistors 80, 81 and 82 are likewise connected to second leads 83, 84 and 85 of the secondary windings 26, 27 and 28, respectively, and each protecting resistor 83, 84 and 85 connects with the other side of a respective double anode zener diode 76, 77 and 78. An error voltage controlling system which includes a resistor and a non-linear conductor connected in series is, therefore, provided across the leads 70 and 74 and across the pairs of leads 83 and 64, 84 and 65, and 85 and 66.

The static switch circuit 68 further includes a resistive summing circuit comprising a set of three resistors 86, 87 and 88 connected to one another in series. One end of the summing circuit terminates in a second output lead 89 of the static switch circuit 68, and the opposite end of the summing circuit is joined at a junction point 90 with the voltage controlling circuit comprising the resistor 79 and the double anode zener diode 75. The summing circuit is also connected to each of the remaining voltage controlling circuits at junction points 91, 92 and 93, and as seen in FIG. 1, each of these connections is made intermediate the resistor and double anode zener diode of the respective controlling circuit. Blocking non-linear conductors also preferably in the form of double anode zener diodes 94, 95 and 96 are placed in the connections of the voltage controlling circuit of the resolvers 19, 20 and 21, respectively, with the summing circuit.

Each of the limiting double anode zener diodes 75, 76, 77 and 78 limit the error voltage output of the resolvers and the linear synchro that is transmitted to the summing circuit to a level which cannot be exceeded. For example, the voltage across the junction point 90 and the output lead 67 will be clipped to a level equal to the sum of the breakdown voltage and forward voltage drop across the limiting double anode zener diode 75. Therefore, regardless of the alternating error voltage induced in the scale winding 33 the voltage produced by the amplifier 69 across the output leads 89 and 67 of the static switch circuit 68 will not exceed the sum of the breakdown voltage and forward voltage drop of the double anode zener diode 75 less the voltage drops across each of the resistors 86, 87 and 88 which comprise the summing circuit.

Each of the blocking double anode zener diodes 94, 95 and 96 has the effect of decreasing the amplitude of error voltage of its resolver 19, 20 and 21, respectively, by an amount about equal to its breakdown voltage. The net result is that each of the sinusoidal curves 59, 60 and 61 are adjusted by an amount equal to the breakdown voltage plus the forward voltage drop of the blocking double anode zener diode 94, 95 and 96, respectively. That is, each of the positive half cycles of the sinusoidal curves 59, 60 and 61 are adjusted downwardly by such amount and each of the negative half cycles are adjusted upwardly by such amount. The resulting adjusted sinusoidal curves will each have a null zone or region of zero error voltage which encompasses the point of correspondence. The purpose of providing such a null zone is to prevent a false point of correspondence which may be caused by a lack of precision of the digital to analog converter 37 and misalignment of the rotor members of the resolvers. For example, if it is desired to move the table 10 to a position 23.451 inches from the reference, the low speed resolver 21 receives a set of input voltages equivalent to 23.4 inches, the medium speed resolver 20 receives a set of voltages equivalent to 3.45 inches, the high speed resolver 19 receives a set of voltages equivalent to .451 inch and the linear synchro 18 receives a set of voltages equivalent to .0510 inch. Such lack of precision of the digital to analog converter 37 may result in the zero transition equivalent to zero induced error voltage being somewhat different for each resolver in that at a desired position point there may exist some output voltages of the lower speed resolvers. Therefore, the null zones are created to prevent transfer of the control of the drive back to lower speed synchros when the induced error voltage in the scale winding 33 is zero at the desired position point. A blocking double anode zener diode is not employed for the output of the scale winding 33 since it is necessary that the curve 62 pass sharply through zero to obtain high resolution for positioning about the point of correspondence.

Therefore, the error voltages fed to the output leads 67 and 89 of the static switch circuit 68 by the resolvers 19, 20 and 21 are limited by the limiting double anode zener diodes 76, 77 and 78, respectively, and by the blocking double anode zener diodes 94, 95 and 96. For example, the error voltage imposed across the output leads 67 and 89 of the static switch circuit 68 by the low speed resolver 21 will be limited to a level equal to the breakdown voltage plus the forward voltage drop of the limiting double anode zener diode 78 less the breakdown voltage and forward voltage drop of the blocking double anode zener diode 96. To facilitate an understanding of the general operation of the static switch circuit 68, let it be assumed that it is desired to move the machine tool table 10 to a new position which is more than five inches away from a present position of the work table. Under such assumed conditions, the positional difference is within the zone of control of the low speed resolver 21 only and, therefore, the low speed resolver 21 must control the output of the static switch circuit 68 to avoid false positioning as hereinbefore described. Although the alternating error voltage induced in the secondary winding 28 of the low speed resolver 21 may be greater or less than the alternating voltages simultaneously induced in the secondary windings 26 and 27 and in the scale winding 33, the voltages applied across the output leads 67 and 89 by the linear synchro 18 and by the high speed resolver 19 and medium speed resolver 20 will be limited, as discussed above, and the level of such voltages will not exceed the voltage applied across such output leads 67 and 89 by the low speed resolver 21. Therefore, the voltage induced in the secondary winding 28 of the low speed resolver 21 will control the output voltage of the static switch circuit 68, and such output voltage ultimately controls the driving of the motor 11 so that the table 10 is moved towards the desired position.

As the positional difference decreases due to the movement of the table 10 towards the desired position, the error voltage induced in the secondary winding 28 of the low speed resolver 21 will decrease to a level less than the breakdown voltage of the limiting double anode zener diode 78 and, consequently, the voltage applied across the output leads 67 and 89 by the low speed resolver 21 will decrease and follow the descending sinusoidal curve 61. Ultimately, the voltage applied across the output leads 67 and 89 by the medium speed resolver 20 will be greater than the voltage applied thereacross by the low speed resolver 21. This will occur within the zone of control of the medium speed resolver 20 and the medium speed resolver 20 will then control the output voltage of the static switch circuit 68 and therefore the driving of the motor 11. As the table 10 continues to move toward the desired position control of the output voltage of the static switch circuit 68 is transferred next to the high speed resolver 19 and ultimately to the linear synchro 18 within the respective zone of control of each. At the desired position, the error voltage induced in the scale winding 33 is zero and the blocking double anode zener diodes 94, 95 and 96 insure that the error voltage which is fed to the output leads 67 and 89 by the resolvers is also zero.

The output lead 67 of the static switch circuit 68 is connected to the discriminator 63 and the second output lead 89 is likewise connected to the discriminator 63 through a normally open sixth relay switch 97 which when actuated connects the second output lead 89 to a conductor 98 connected in turn to the discriminator 63. The alternating error voltage fed to the discriminator 63 is compared with a reference voltage to produce a direct voltage which has a polarity which corresponds to the direction of positional error and a magnitude corresponding to the amount of positional error. The direct voltage output of the discriminator 63 is fed to the motor control unit 17 to control the direction and speed of the motor 11. The conductor 73, to which the lead 71 from the linear synchro amplifier 69 is connected when the fifth relay switch 72 is in its relay drop-out position, is connected to the conductor 98 which leads to the discriminator 63.

The output voltage across the leads 67 and 89 of the static switch circuit 68 is also fed to an amplifier 99 through a pair of conductors 100 and 101 which are connected to such output leads 67 and 89, respectively. A conductor 102 leads from the output of the amplifier 99 to the positive side of a D.C. source 103, and a second conductor 104 leads from the output of the amplifier 99 to the pole of a normally open seventh relay switch 105 of the relay 49 which, when actuated, connects the conductor 104 to a conductor 106 which in turn is connected to one side of a normally open master switch 107. A conductor 108 connects the second side of the master switch 107 to the negative side of the D.C. source 103. The coil of the relay 49 is connected across the conductors 102 and 106.

At the start of a positioning operation, information concerning a desired fixed position of the table 10 is fed to the command unit 36. The command unit 36 may perform the function of closing the master switch 107 automatically at this time or the master switch 107 may be closed manually. Closing of the master switch 107 places the coil of the relay 49 across the D.C. source 103 to energize the relay 49 and thereby move the associated relay switches to their actuated positions. The energization of the relay 49, therefore, will close the normally open seventh relay switch 105 thereby connecting the coil of the relay 49 across the output of the amplifier 99. Once error voltages appear across the output leads 67 and 89 of the static switch circuit 68, the master switch 107 is opened and thereafter the relay 49 is dependent upon the error voltage output of the static switch circuit 68, as amplified by the amplifier 99 for its continued energization.

Simultaneously with the closing of the master switch 107, the influx of position information from the command unit 36 to the digital to analog converter 37 will produce voltage outputs of the converter 37 which are indicative of the desired position for the table 10. As stated earlier, the voltage output of the converter 37 is in terms of the angular positions of the rotors of the resolvers which will yield the desired position of the table 10. Assume, for example, that it is desired to move the table 10 to a position which is 23.451 inches from a constant reference. Since the rotor member of the high speed resolver 19 makes one complete revolution for each one inch of linear travel of the table 10, the rotor member would complete twenty-three revolutions and .451 of a complete revolution as the table 10 is moved from the reference to the desired position. Thus, the rotor of the resolver 19 must come to rest in a final angular position which is displaced .451×360° or 162.36° from a reference angular position. The rotor member of the resolver 19 would complete twenty-three revolutions only if the previous position of the table 10 was at the reference, and the rotor member of the resolver 19 may make a greater or lesser number of revolutions if the previous position of the table 10 is other than at the reference. However, regardless of the previous position of the table 10, the rotor member would be displaced 162.36° from a reference angular position when the table 10 reaches the desired position. Therefore, the voltage imposed across the conductors 40 and 42 would be in terms of a reference voltage times the sine of 162.36° and the voltage imposed across the conductors 41 and 42 would be in terms of the same reference voltage times the cosine of 162.36°. When the table 10 has moved to the desired position, the rotor member of the resolver 19 will be at 162.36° from its angular reference position and the voltage induced in the secondary winding 26 of the resolver 19 will be zero. Similar voltages must be imposed across the two elements which comprise each of the primary windings 24 and 25 of the remaining resolvers 20 and 21.

Similar voltages are also fed to the slider windings 31 and 32 of the linear synchro 18. Since a linear movement of 0.1 inch of the table 10 and, consequently, a similar linear movement of the slider 29 relative to the scale 30 is equivalent to a 360° rotation of a rotor member relative to a stator member, the slider 29 would travel through 234 such increments of distance plus .51×0.1 inch or .051 inch as the table 10 traveled 23.451 inches from the reference desired position. Relating this linear movement to the equivalent angular rotation results in an equivalent angle of 0.510×360° or 183.60°. Therefore, the slider 29 would come to rest at an equivalent angular position 183.60° away from a reference position when the table 10 has reached the desired position. The voltage output of the converter 37 imposed across the conductors 43 and 45 would then be in terms of the above mentioned reference voltage times the sine of 183.60° and the voltage imposed across the conductors 44 and 45 would be in terms of such reference voltage times the cosine of 183.60°.

The foregoing discussion of the analog information fed from the digital to analog converter 37 to the resolvers and linear synchro 18 would hold true for multi-speed error detector feedback systems generally. However, with the single side approach system of this invention, the table 10 is first momentarily positioned at an offset position which is an unvarying distance from a final position for the table 10, and this offset position is always to the same one side of the final position. The distance between the offset position and the final position is equal to one-quarter of the linear movement required of the slider 29 relative to the scale 30 to complete one cycle. In the system being described, the offset distance would be one-quarter of 0.1 inch or 0.025 inch.

To achieve the initial positioning of the table 10 at the offset position, it is necessary to adjust the control system so that the error voltage induced in the primary windings 26, 27 and 28 of the resolvers will be zero when the table 10 has reached the offset position. This may be accomplished either by changing the position of the reference for the command information by an amount equal to 0.025 inch, or by physically adjusting the stators of the resolvers 19, 20 and 21 to displace them an angular distance equivalent to a table travel of 0.025 inch from the angular reference position. In either event, the error voltage output of the resolvers 19, 20 and 21 will be zero when the table 10 has reached the offset position, and this adjustment is accomplished without disturbing the analog data fed to the resolvers by the converter 37 in that the analog data remains in terms of the final position of the table 10 rather than in terms of the offset position.

Adjustment of the linear synchro 18 to reach a null at the offset position is accomplished by switching the analog voltages fed to the slider windings 31 and 32. Since at the start of the positioning operation the relay 49 will be picked up, the relay switches 48, 52, 55 and 57 will be moved to their actuated positions. With the relay switches in their actuated position, the voltage across conductors 43 and 45 which is in terms of the sine of the equivalent angular position, say 183.60°, is fed without change in its polarity through the transformer 54 to the cosine winding 32 and the voltage across conductors 44 and 45 in terms of cosine of 183.60° is fed with reversed polarity to the sine winding 31 through the transformer 50. Thus, after the switching has been accomplished, the error voltage induced in the scale winding 33 will be zero when the table 10 has reached a position which is removed a linear distance equivalent to an angular displacement of 90° since the sine of any angle plus 90° is equal to the cosine of such angle, and the cosine of the angle plus 90° is equal to the negative of the sine of such angle. Specifically, the sine of 183.60° is equal to the cosine of 93.60° and the cosine of 183.60° is equal to the negative value of the sine of 93.60°. Therefore, the same analog input information which would yield the final position is employed to produce zero induced error voltage when the table 10 has reached the offset position.

The analog voltages above described are imposed across the primary windings of the resolvers 19, 20 and 21 and across the scale windings 31 and 32 thereby inducing error voltages in the secondary windings 26, 27 and 28 of the resolvers and in the scale winding 33 which are fed to the static switch circuit 68. With the relay 49 energized, the fifth relay switch 72 will be in its actuated position in which it connects the output of the linear synchro amplifier 69 to the static switch circuit 68. As described above, the static switch circuit 68 will transfer control of its output voltage from lower speed resolvers to higher speed resolvers and ultimately to the linear synchro 18 as the positional disagreement decreases until at the offset position the output voltage of the static switch circuit 68 will be zero. The output voltage of the static switch circuit 68 is fed to the discriminator 63 while the relay 49 is actuated through the closed relay switch 97.

Since the output voltage of the static switch circuit 68 decreases to zero when the table 10 has reached the offset position, the coil of the relay 49 will be deenergized. Deenergization of the coil of the relay 49 returns the associated relay switches to their drop-out positions. Specifically, opening of the sixth relay switch 97 opens the connection from the static switch circuit 68 to the discriminator 63 and the return of the fifth relay switch 72 connects the output lead 71 of the linear synchro amplifier 69 to the discriminator 63 through the conductors 73 and 98. Therefore, when the table 10 has reached the offset position, the linear synchro error voltage output is fed to the discriminator 63 directly so that the linear synchro 18 has exclusive control of the driving circuit means which includes the discriminator 63 and the motor control unit 17.

Deenergization of the coil of the relay 49 also permits the relay switches 48, 52, 55 and 57 in their drop-out positions the voltage in terms of the sine of the equivalent angular position of the linear synchro 18 is fed to the sine slider winding 31 and the voltage in terms of the cosine is fed to the cosine slider winding 32. There is, then induced in the scale winding 33 an error voltage indicating a positional disagreement equal to the offset distance, and this error voltage is fed directly to the driving circuit means to control the motor 11 which will then drive the table 10 to the final position. At the final position of the table 10, the error voltage induced in the scale winding 33 is zero. The control system is now ready for further positioning demands.

Further understanding of the action of the single side approach system may be had by reference to FIG. 3. In FIG. 3, the manner of achieving first an offset position and then a final position is illustrated by use of the sinuosidal error voltage curves. FIG. 3 is a portion of the sinuosidal curves 62, 59, 60 and 61 to an enlarged scale. The sinuosidal curve 62 for the linear synchro 18 will exhibit a null or point of zero error voltage at the offset point, which is represented in FIG. 3 as point 109, because of the switching of analog voltages heretofore described. As previously mentioned, the resolvers 19, 20 and 21 are adjusted to yield zero error voltage at the offset point and the curves 59, 60 and 61 for such resolvers likewise ideally pass through zero at the offset point 109. Thus, as illustrated in FIG. 3, the table 10 is first moved to the offset point 109 under the combined control of the resolvers and linear synchro 18. A sinuosidal curve 111 for the linear synchro 18 represents the error voltage induced in the scale winding 33 after the above described switching of the analog input voltages has taken place. It will be noted that the curve 111 is displaced an equivalent angular distance of 90° from the curve 62. Thus, when the offset point 109 has been reached, and control of the drive circuit means has been transferred to the linear synchro 18, the error voltage induced in the scale winding 33 will be a maximum and will cause the motor 11 to drive the table 10 the final position represented by a point 110.

It should be noted that the offset point 109 is always to the same side of the final point 110. Whether the table 10 approaches the final point 110 from either the right or left as viewed in FIG. 3, the table 10 will always be initially positioned at the offset point 109. By halting the table momentarily at an offset position, the momentum of the drive for the table 10 including the servo-motor 11 is taken up in the positioning to the offset, and thereafter it is possible to then position at the final position with greater accuracy and precision since there is minimum tendency on the part of the servo-motor 11 to over shoot the final position. Furthermore, the minimum possible distance which may be programmed is increased greatly since the table 10 is always first moved to the offset position.

While the single side approach system has been described in conjunction with a control system employing a linear synchro as the final positioning control, the single side approach system has equal application in control systems which employ rotary synchros as the final positioning control. That is, rotary synchros having two 90° spaced input windings are equivalent in their function to the linear synchro 18 with its sine and cosine windings 31 and 32. Since the use of a rotary synchro as the final positioning control would require that such rotary synchro be mechanically coupled to the table 10, the use of the single side approach system of this invention would also eliminate the inherent and mechanical backlash in the gearing. This would follow since positioning of the table 10 to an offset point always to the same one side of the final position would result in positioning to the final position always against the same side of the gear teeth which may form the mechanical connection.

We claim:

1. In an object position control system, the combination comprising: analog input signal means adapted to produce input voltages indicative of a selected final position for the object; an induction device movable in response to motion of the object and having a sine input winding and a cosine input winding in 90° space phase relation and an output winding relatively movable with respect to the input windings and that is inductively coupled to the input windings, said input windings being connected to said analog input signal means to receive said input signals in terms of the sine and cosine of the equivalent angular position between the output winding and the input windings which will yield said final position; driving circuit means for said object connected to said output winding and to which signal voltages of said output winding are fed; and switching means in the connections of said input windings to said analog input signal means and adapted to connect the input signals in terms of the cosine of said equivalent angular position to said sine winding with reversed polarity and to connect the input signals in terms of the sine of said equivalent angular position to said cosine winding to cause said object to be moved to an offset position displaced from said final position, and thereafter to connect the input signals in terms of the sine of said equivalent angular position to said sine winding and to connect the input signals in terms of the cosine of said equivalent angular position to said cosine winding to cause said object to be moved to said final position.

2. In an object position control system, the combination comprising: analog input signal means adapted to produce input voltages indicative of a selected final position for the object; a succession of induction devices movable in response to motion of the object and each having input windings and an output winding relatively movable with respect to the input windings and that is inductively coupled to the input windings, said input windings being connected to said analog input signal means to receive said input signals in terms of the sine and cosine of the equivalent angular position between the output winding and the input windings which will yield said final position, a first of said induction devices having a relatively high rate of change of signal voltages of its output winding relative to movement of said object and having a sine input winding and a cosine input winding in 90° space phase relation, the others of said induction devices having successively lesser rates of change of signal voltages of their output windings and being adjusted to yield zero signal voltages in their output windings when said object has been moved to an offset position displaced from said final position a distance required to move the output winding of said first induction device relative to its input windings through an equivalent angle of 90°; a signal voltage switching circuit for said output windings and adapted to produce output voltages controlled by the signal voltages of the output windings; driving circuit means for said object connected to said voltage switching circuit and to which output voltages of said voltage switching circuit are fed; and switching means in the connections of said sine and cosine input windings to said analog input signal means and adapted to connect the input signals in terms of the cosine of said equivalent angular position to said sine winding with reversed polarity and to connect the input signals in terms of the sine of said equivalent angular position to said cosine winding to cause said object to be moved to said offset position, and adapted thereafter to connect the input signals in terms of the sine of said equivalent angular position to said sine winding and to connect the input signals in terms of the cosine of said equivalent angular position to said cosine winding to cause said object to be moved to said final position.

3. In a control system for positioning an object, the combination comprising: analog input signal means adapted to produce input voltages indicative of a selected final position for the object; a succession of induction devices movable in response to motion of the object and each having input windings and an output winding relatively movable with respect to the input windings and that is inductively coupled to the input windings, said input windings being connected to said analog input signal means to receive said input signals in terms of the sine and cosine of the equivalent angular position between the output winding and the input windings which will yield said final position, a first of said induction devices having a relatively high rate of change of signal voltages of its output winding relative to movement of said object and having a sine input winding and a cosine input winding in 90° space phase relation, the others of said induction devices having successively lesser rates of changes of signal voltages of their output windings and being adjusted to yield zero signal voltages when said object has been moved to an offset position displaced from said final position a distance required to move the output winding of said first induction device relative to its input winding through an equivalent angle of 90°; a signal voltage switching circuit for said output windings and adapted to produce output voltages controlled by the signal voltages of the output windings, driving circuit means for said object connected to said voltage switching circuit and to which output voltages of said voltage switching circuit are fed; and switching means including switching contacts in the connections of said sine and cosine input windings to said analog input signal means and adapted to connect the output winding of said first induction device to said signal voltage switching circuit and to connect the input signals in terms of the cosine of said equivalent angular position to said sine winding with reversed polarity and to connect the input signals in terms of the sine of said equivalent angular position to said cosine winding to move said object to said offset position, and being further adapted to connect the output winding of said first induction device to said driving circuit means and to break the connection between said signal voltage switching circuit and said driving circuit means and to connect the input signals in terms of the sine of said equivalent angular position to said sine winding and to connect the input signals in terms of the cosine of said equivalent angular position to said cosine winding when the output voltage of said signal voltage switching circuit is zero.

4. In a control system for positioning an object the combination comprising: analog input signal means adapted to produce input voltages indicative of a selected final position for the object; a succession of induction devices movable in response to motion of the object and each having input windings and an output winding relatively movable with respect to the input windings and that is inductively coupled to the input windings, said input windings being connected to said analog input signal means to receive said input signals in terms of the sine and cosine of the equivalent angular position between the output winding and input windings which will yield said final position, a first of said induction devices having a relatively high rate of change of signal voltages of its output winding relative to movement of said object and having a sine input winding and a cosine input winding in 90° space phase relation, the others of said induction devices having successively lesser rates of change of signal voltages of their output windings and being adjusted to yield zero signal voltages when said object has been moved to an offset position displaced from said final position a distance required to move the output winding of said first induction device relative to its input winding through an equivalent angle of 90°; a signal voltage switching circuit connected to said output windings and adapted to produce output voltages controlled by the signal voltages of the output windings; driving circuit means for said object connected to said voltage switching circuit and to which output voltages of said voltage switching circuit are fed; a switch including a coil connected across the output of said signal voltage switching circuit for energization by output voltages produced by said signal voltage switching circuit; switching contacts responsive to said coil and in the connections of said sine and cosine input windings to said input signal means and having drop-out positions connecting the input signals in terms of the sine and cosine of said equivalent angular position to said sine and cosine winding respectively and having switch actuated positions connecting the input signals in terms of the cosine of said equivalent angular position to said sine winding with reversed polarity and connecting the input signals in terms of the sine of said equivalent angular position to said cosine winding; switching contacts responsive to said coil and having a drop-out position connecting the output winding of said first induction device to said signal voltage switching circuit and a switch actuated position connecting the output winding of said first induction device to said driving circuit means, normally open switching contacts responsive to said coil and in a connection of said signal voltage switching circuit with said driving circuit means; and means for initially energizing said coil to cause the object to be moved to said offset position at which the output of said signal voltage switching circuit is zero and said coil is deenergized to cause movement of said object to said final position.

No references cited.